(12) United States Patent
Li et al.

(10) Patent No.: US 8,966,187 B2
(45) Date of Patent: Feb. 24, 2015

(54) FLEXIBLE REPLICATION WITH SKEWED MAPPING IN MULTI-CORE CHIPS

(75) Inventors: Jian Li, Austin, TX (US); William Evan Speight, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 13/309,402

(22) Filed: Dec. 1, 2011

(65) Prior Publication Data

US 2013/0145210 A1 Jun. 6, 2013

(51) Int. Cl.
*G06F 13/00* (2006.01)
*G06F 13/28* (2006.01)

(52) U.S. Cl.
USPC .................. 711/141; 711/124; 711/E12.023; 709/217

(58) Field of Classification Search
CPC ......................... G06F 12/0842; G06F 12/0831
USPC .................. 711/141, 124, E12.023; 709/217
See application file for complete search history.

(56) References Cited

U.S. PATENT DOCUMENTS

| | | | |
|---|---|---|---|
| 5,875,470 A | 2/1999 | Dreibelbis et al. | |
| 6,128,750 A | 10/2000 | Espy et al. | |
| 6,275,900 B1 | 8/2001 | Liberty | |
| 6,658,538 B2 | 12/2003 | Arimille et al. | |
| 7,055,054 B2 | 5/2006 | Olarig | |
| 7,451,341 B2 | 11/2008 | Okaki et al. | |
| 7,574,562 B2 | 8/2009 | Shen et al. | |
| 7,685,354 B1* | 3/2010 | Hetherington et al. | 711/5 |
| 8,799,624 B1* | 8/2014 | Griffin et al. | 712/29 |
| 2002/0019921 A1* | 2/2002 | Hagersten et al. | 711/205 |
| 2009/0144531 A1* | 6/2009 | Harikumar et al. | 713/2 |
| 2011/0125971 A1* | 5/2011 | Kruglick | 711/130 |
| 2011/0271277 A1* | 11/2011 | Hussain et al. | 718/1 |
| 2012/0266179 A1* | 10/2012 | Osborn et al. | 718/105 |
| 2013/0145211 A1* | 6/2013 | Li et al. | 714/13 |

OTHER PUBLICATIONS

Wang et al., "Address Remapping for Static NUCA in NoC-Based Degradable Chip- Multiprocessors," Proceedings, pp. 70-76, 2010 IEEE 16th Pacific Rim International Symposium on Dependable Computing, 2010.

* cited by examiner

*Primary Examiner* — Edward Dudek, Jr.
(74) *Attorney, Agent, or Firm* — Garg Law Firm, PLLC; Rakesh Garg; William J. Stock

(57) ABSTRACT

For a flexible replication with skewed mapping in a multi-core chip, a request for a cache line is received, at a receiver core in the multi-core chip from a requester core in the multi-core chip. The receiver and requester cores comprise electronic circuits. The multi-core chip comprises a set of cores including the receiver and the requester cores. A target core is identified from the request to which the request is targeted. A determination is made whether the target core includes the requester core in a neighborhood of the target core, the neighborhood including a first subset of cores mapped to the target core according to a skewed mapping. The cache line is replicated, responsive to the determining being negative, from the target core to a replication core. The cache line is provided from the replication core to the requester core.

6 Claims, 5 Drawing Sheets

FLEXIBLE REPLICATION WITH SKEWED MAPPING IN MULTI-CORE CHIPS

BACKGROUND

1. Technical Field

The present invention relates generally to a system, and computer program product for managing cache line replication in multi-core integrated circuits components (chips). More particularly, the present invention relates to a system, and computer program product for a flexible replication with skewed mapping in a multi-core chip.

2. Description of the Related Art

Data processing systems include processors for performing computations. A processor can include multiple processing cores. A core is a processor or a unit of a processor circuitry that is capable of operating as a separate processing unit. A core includes the processor circuitry as well as data storage, such as a level 1 cache (L1) and a level 2 cache (L2). Some data processing systems can include multiple processors.

A single chip including multiple cores thereon is called a multi-core chip. In a multi-core chip, one core may request a cache line from another core in a process called cache line replication (replication). A block of data in a cache of a core is called a cache line.

SUMMARY

The illustrative embodiments provide a system, and computer program product for a flexible replication with skewed mapping in a multi-core chip. An embodiment receives, at a receiver core in the multi-core chip from a requester core in the multi-core chip, a request for a cache line, wherein the receiver and requester cores comprise electronic circuits, and wherein the multi-core chip comprises a set of cores including the receiver and the requester cores. The embodiment identifies a target core from the request to which the request is targeted. The embodiment determines whether the target core includes the requester core in a neighborhood of the target core, the neighborhood including a first subset of cores mapped to the target core according to a skewed mapping. The embodiment replicates, responsive to the determining being negative, the cache line from the target core to a replication core. The embodiment provides the cache line from the replication core to the requester core. The support mechanisms of the skewed mapping facilitate flexible replications and improve fault tolerance in any location on a multi-core chip.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Cores in a multi-core chip are arranged in a grid. In response to a cache line request, data may have to be communicated from one core to another core across this grid. In the worst case scenario, a core on one corner of the grid may supply the requested cache line to another core in a diametrically opposite corner of the grid.

Communicating data across long distances (relative the dimensions of core components, which can be of the order of nanometers) causes several problems, such as timing delays and noise. One technique that is presently used in multi-core chips is to overlay a smaller grid on the grid of cores. The grid of cores as a whole has one home core, which lies in one of the sub-grids thus created. In each of the sub-grids, one core is designated as a replica core. A replica core in a sub-grid is responsible for receiving replicated cache lines from the home core of the grid and replicating to other cores in the sub-grid. A home core for a grid is a replica core for a sub-grid but a replica core for a sub-grid is not necessarily a home core for the grid.

Figure 1:
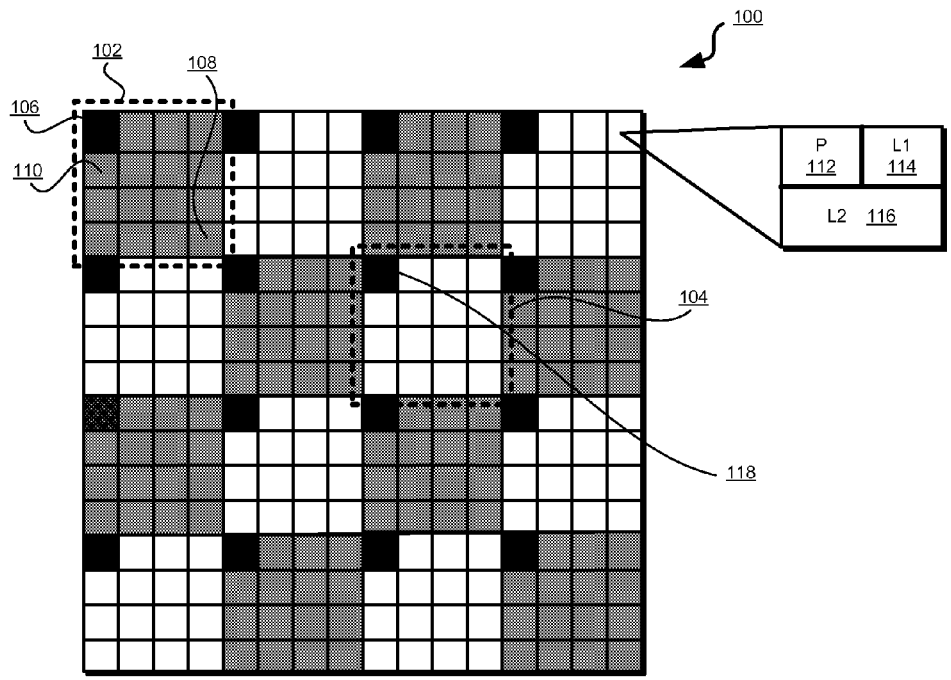
FIG. 1 depicts a method of replication amongst cores in a multi-core chip that can be improved using an illustrative embodiment.

With reference to FIG. 1, this figure depicts a method of replication amongst cores in a multi-core chip that can be improved using an illustrative embodiment. As an example, a multi-core chip including a 16×16 grid of 256 cores is depicted as grid 100. The top left core in grid 100 is at coordinate (0,0), and the bottom right core of grid 100 is at coordinate (15,15). Each core in grid 100 comprises processor 112, and one or more data storage memories, such as L1 cache 114 and L2 cache 116.

Sub-grids 102 and 104, and other similar sub-grids divide grid 100 into core neighborhoods (neighborhood). Thus, sub-grid 102 forms neighborhood 102, and so on. Neighborhood 102 includes 16 cores located at coordinates (0,0) through (3,3).

Using neighborhood 102 as an example, core 106 at (0,0) is designated a home core. Home core 106 is responsible for replication to the remaining 15 cores located from coordinates (0,1) through (3,3) in neighborhood 102. In other words, cores (0,1) through (3,3) are mapped to core (0,0) in a replication mapping (mapping). Home core 106 is also the home core for grid 100. Accordingly, home core also 106 replicates to replica cores in other sub-grids, such as to replica core 118 in sub-grid 104 and other replica cores in other sub-grids depicted by blackened squares in the sub-grids.

The illustrative embodiments recognize that cost of replicating from one core to another in a multi-core chip can be represented in terms of the horizontal+vertical distance between the two cores. As an example, replicating from home core 106 to core 108 located at coordinate (3,3) is the worst case replication scenario in sub-grid 102. The cost of this replication is 3+3=6. As another example, replicating from home core 106 to core 110 located at coordinate (0,1) is one of the best case replication scenarios in sub-grid 102. The cost of this replication is 0+1=1.

The illustrative embodiments recognize that a wide range in costs of replicating in a grid (or sub-grid), such as a variable cost between 1 and 6 in sub-grid 102, is not desirable. The illustrative embodiments further recognize that the presently used methods of mapping not only allow such variability in replication costs, but are also static in nature. In other words, the neighborhood is rather simply and statically defined in a multi-core chip, such as shown by grid 100 and the sub-grids therein.

The illustrative embodiments recognize that static mapping as shown in FIG. 1 is inefficient for managing cache failures. A cache failure is a failure of a core to operate in a desirable manner such that the core experiencing the failure has to be isolated from participating in cache line replications.

The illustrative embodiments used to describe the invention generally address and solve the above-described problems related to replication in multi-core chips. The illustrative embodiments provide a system, and computer program product for a flexible replication with skewed mapping in a multi-core chip.

The illustrative embodiments are described herein using a simplified skewed mapping only as an example, and not as a limitation on an embodiment. A skewed mapping according to an embodiment can be made using irregular shapes or patterns of neighborhoods, different distances between different pairs of home and replica cores, or a combination thereof, within the scope of the illustrative embodiments.

The illustrative embodiments are described with respect to certain components, such as multi-core processor chips, only as examples. Such descriptions are not intended to be limiting on the illustrative embodiments. For example, an illustrative embodiment can be implemented in a similar manner with respect to another type of multi-unit data storage chip, such as where multiple memory units are arranged in a grid similar to grid 100 in FIG. 1 and similarly participate in moving data from one unit to another within the grid, within the scope of the illustrative embodiments.

Similarly, the illustrative embodiments are described with respect to certain identifiers and names only as examples. Such descriptions are not intended to be limiting on the illustrative embodiments. For example, an illustrative embodiment described with respect to address format can be implemented using a different manner of identifying the home core, replica cores, or neighborhoods within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An illustrative embodiment may be implemented in hardware, software, or a combination thereof. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may be implemented in any suitable language or platform such as Java®, C++, or Object Resource Broker (ORB) programming model (e.g. CORBA). An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

An embodiment or a part thereof may be implemented as program code instructions. The program code instructions can execute on a computer using a processor and a memory, such as described with respect to a data processing system in FIG. 2.

Figure 2:
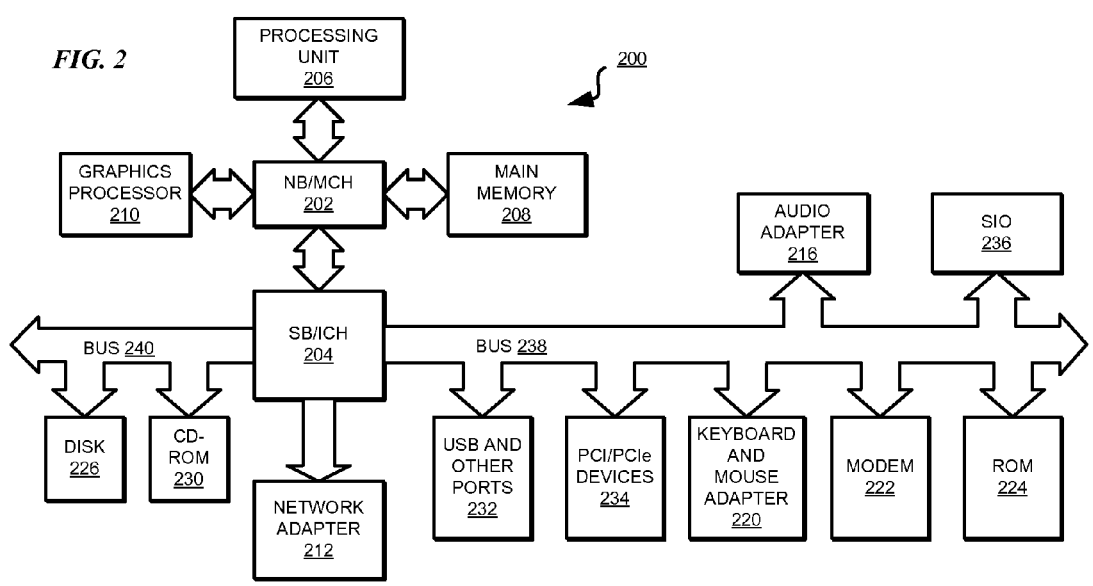
FIG. 2 depicts a block diagram of a data processing system in which illustrative embodiments may be implemented.

With reference to FIG. 2, this figure depicts a block diagram of a data processing system in which illustrative embodiments may be implemented. Data processing system 200 is an example computer that can be used to implement a method according to an embodiment, a computer usable program product according to an embodiment, or a system according to an embodiment.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/C controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java® programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
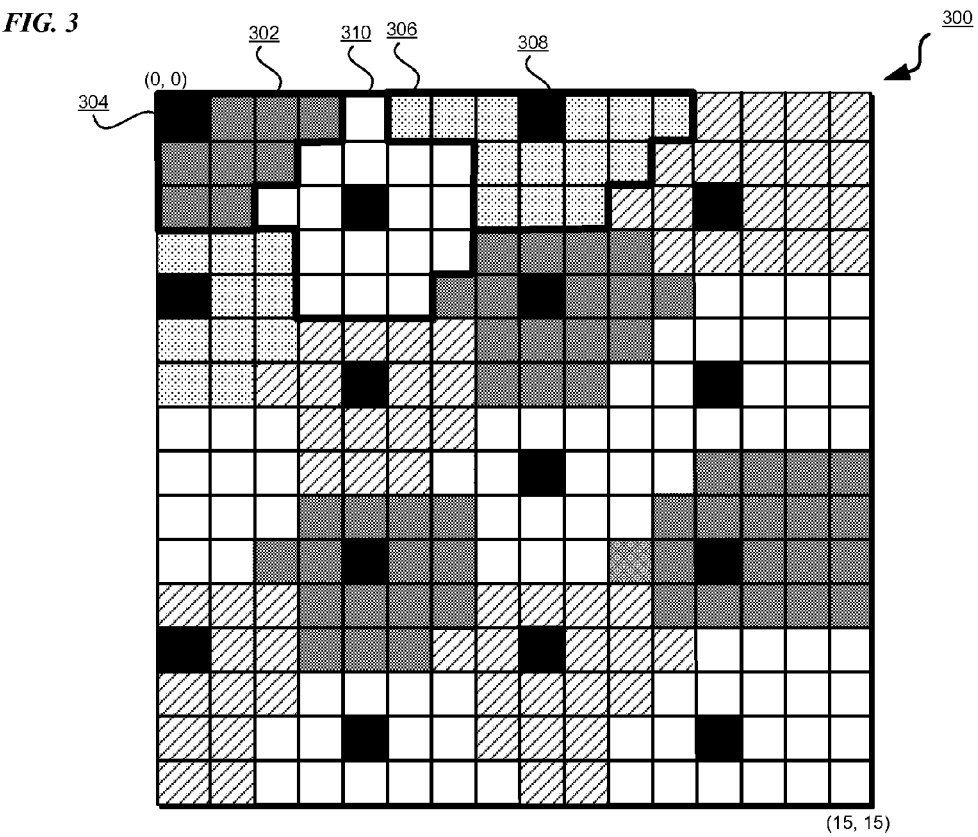
FIG. 3 depicts a skewed mapping for replication in a multi-core chip in accordance with an illustrative embodiment.

With reference to FIG. 3, this figure depicts a skewed mapping for replication in a multi-core chip in accordance with an illustrative embodiment. The multi-core chip depicted as grid 300 is analogous to the multi-core chip depicted as grid 100 in FIG. 1.

Instead of a sub-grid of a geometric shape, as an example, grid 300 depicts a set of skewed sub-grids of irregular shapes. For example, sub-grid 302 includes 9 cores located at (0,0)-(3,0), (0,1)-(2,1), and (0,2)-(1,2). Core 304 at (0,0) is the replica core for sub-grid 302 and the home core for grid 300. Sub-grid 306 includes 14 cores located at (5,0)-(11,0), (7,1)-(10,1), and (7,2)-(9,2). Core 308 at (8,0) is the replica core for sub-grid 306. Sub-grid 310 includes 17 cores located at (4,0), (3,1)-(6,1), (2,2)-(6,2), (3,3)-(6,3), and (3,4)-(5,4). Core 312 at (4,2) is the replica core for sub-grid 310.

Notice that the shapes of sub-grids, or neighborhoods, 302, 306, and 310 can include, but do not necessarily include geometric shapes as in grid 100 in FIG. 1. Particularly, neighborhoods 302, 306, and 310, and other neighborhoods in grid 300 axe configured to minimize the cost of replication, such as latency in replicating data, within the neighborhood. Consider neighborhood 302 as an example, one of the worst case scenarios for cost of replication in neighborhood 302 is for replicating the core at (2, 1) from home core 304 at (0,0), which is 2+1=3. Compared to the worst case cost of replicating in sub-grid 102 in FIG. 1, which was 6.

The skewed mapping that results in such neighborhoods, as depicted in FIG. 3 by example, can utilize any number of criteria for skewing, and skewing the neighborhoods in a particular way. For example, in one embodiment, the skewing is as simple as shifting the home or replica core functions in one column of home or replica cores according to a prior art mapping to the corresponding cores two rows below in the same column. E.g., if a prior art mapping designated cores (4,0), (4,4), (4, 8), and (4,12) in grid 100 in FIG. 1 as home or replica cores, a simplified skewed mapping could designate cores (4,2), (4,6), (4, 10), and (4,14) in grid 300 in FIG. 3 as corresponding home or replica cores, thereby skewing the geometry of certain neighborhoods from a square to a rhombus.

As an example, in another embodiment, one neighborhood in grid 300 includes no core more than x units of distance away from the corresponding home or replica core, because the volume of replication observed amongst the cores of that neighborhood exceeds a threshold. In the same embodiment, another neighborhood in grid 300 includes cores more than x units of distance away from the corresponding home or replica core, because the volume of replication observed amongst the cores of that neighborhood is up to or below the threshold.

Thus, the skewed mapping of an illustrative embodiment provides flexibility in mapping cores to home or replica cores for replication, which is not available or possible with static and simplistic mapping of the prior art. The flexibility in the replication due to the skewing can correspond to any suitable set of one or more criterion, including but not limited to the example volume threshold described above. Some more aspects of the flexibility, such as reconfiguring a skewed mapping at runtime due to cache failures, are described with respect to other embodiments herein.

Figure 4:
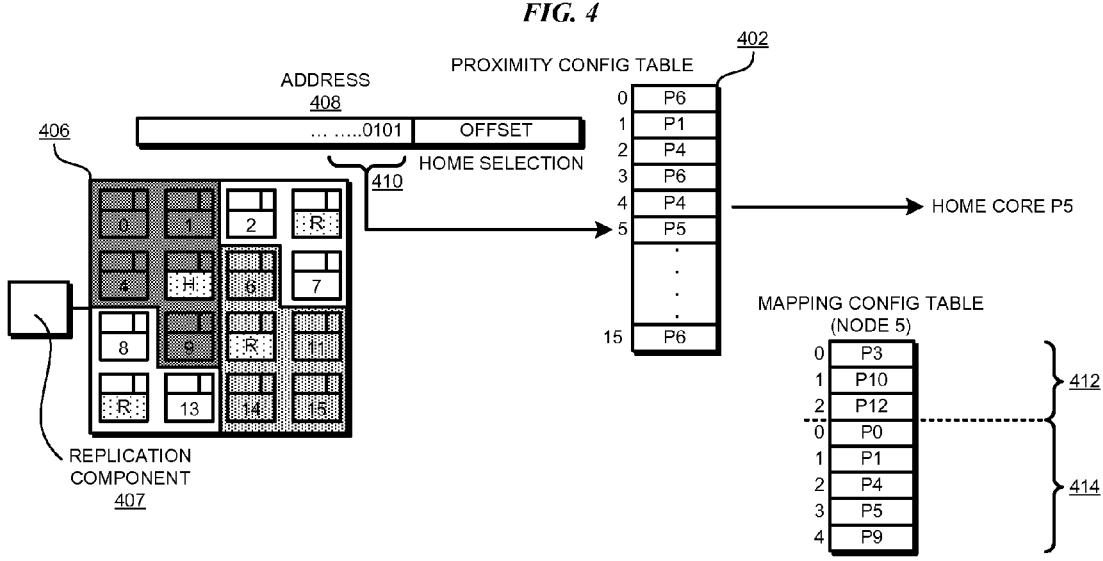
FIG. 4 depicts a supporting mechanism for flexible replication with skewed mapping in multi-core chips in accordance with an illustrative embodiment.

With reference to FIG. 4, this figure depicts a supporting mechanism for flexible replication with skewed mapping in multi-core chips in accordance with an illustrative embodiment. The mechanism uses tables 402 and 404, which can be implemented in hardware, software, or a combination thereof, in a component that coordinates the replication in multi-core chips. Tables 402 and 404 are depicted and described as tables only for the clarity of the description and not as a limitation on the illustrative embodiments. An implementation can maintain similar information in other forms, such as a list of registers, within the scope of the illustrative embodiments.

For the clarity of the description, in FIG. 4, the replication operation using skewed mapping is described using a smaller multi-core chip of only 16 cores, as compared to the 256 core chip depicted in FIG. 3. Chip 406 includes the 16 cores organized into neighborhoods 1, 2, 3, and 4. In a clockwise order of the neighborhoods, neighborhood 1 includes cores 0, 1, 4, 5, and 9, with core 5 as the home core. Neighborhood 2 includes cores 2, 3, and 7, with core 3 serving as a replica core. Neighborhood 3 includes cores 6, 10, 11, 14, and 15, with core 10 serving as a replica core. Neighborhood 4 includes cores 8, 12, and 13, with core 12 serving as a replica core.

Note that neighborhoods 1, 2, 3, and 4 are skewed according to some criteria, as described above. Further note that while cores 5, 3, 10, and 12 are designated as home or replica cores for their respective neighborhoods, core 5, labeled "H" is the home core for chip 406, with home cores 3, 10, and 12 serving as replica cores for home core 5.

In an example operation, suppose core 11 requests a cache line from home core 5. Home core 5 determines that core 11 is in the neighborhood of replica core 10. Home core 5 replicates the requested cache line to its replica core 10, which services the cache line request from core 11. Subsequent cache line requests from core 11 are also directed to replica core 10.

A replica core serves not only as a replica core for a neighborhood, but also as a replication source for another replica core of another neighborhood. Furthermore, in the event of a cache failure in a home or replica core, another replica home core on the chip can take over and act as the home core for the chip, replica core for the failed replica core's neighborhood, or both.

Replication component 407 manages the replication between cores in chip 406. Replication component 407 also implements the support mechanism, e.g., tables 402 and 404, and versions thereof, for the flexible replication using the skewed mapping according to an embodiment. Replication component 407 may be implemented on chip 406, such as in a core on chip 406, or in another hardware or software within or external to chip 406, within the scope of the illustrative embodiments. In one embodiment, replication component 407 may be implemented in a distributed fashion with supporting mechanism, e.g., in a cache controller that belongs to a processor core. Advantageously, such an embodiment for the distributed implementation leverages the fact that typical cache controllers include cache coherence support that facilitates replication. Such an embodiment that facilitates distributed replication support in cache controllers can improve the replication protocol performance.

In one embodiment, replication component 407 may select a substitute for a failed replica core from a set of one or more replica cores according to some priority. For example, relative distances between core 5 and cores 3, 10, and 12 can be used to prioritize cores 3, 10, and 12, should core 5 experience a cache failure. As an example, when core 5 experiences a cache failure (fails), if core 10 is operational, core 10 may be selected in preference to cores 3 and 12. If core 10 has also failed, replication component 407 may select core 3 in preference to core 12, and so on.

Returning to the example operation of core 11 requesting a cache line from home core 5, the operation of replicating the cache line to core 10 is described in more detail. Core 11 requests the cache line using address 410. Address 410 is usable to identify a home or replica core. Only as an example, and without implying a limitation thereto, suppose that the lowest four bits in address 408 can be used to identify the home or replica core.

In the depicted example, hits "0101" (decimal value 5), called home selection bits 410, provide an index in table 402. Table 402 at index 5 stores an identifier corresponding to core 5 as the home core. Accordingly, the cache request for address 408 is directed to core 5.

Core 5 references table 404, which includes two parts 412 and 414. Part 412 of table 404 includes replica cores corresponding to core 5. Part 414 of table 404 includes cores in core 5's neighborhood.

For the depicted example, part 412 shows that cores 3, 10, and 12 are the replicas for core 5. In one embodiment, part 412 includes the replica cores in an order of priority that can be used for substituting failed core 5 in the manner described above.

Part 414 shows that cores 0, 1, 4, 5, and 9 form the neighborhood of core 5. Core 5 is itself included in the neighborhood because core 5 is in fact like any other core in a neighborhood, and can perform other operations along with performing the home core functions. A version of table 404 is available for each home or replica core in this manner.

Core 5, referencing a version of table 404 associated with core 5 (and including core 5's replica cores and neighborhood members) to determine from part 414 that requesting core 11 is not a member of core 5's neighborhood. Core 5, using part 412, determines a replica core whose corresponding version of table 404 includes core 11 in part 414. Core 5 identifies core 10 according to the depicted part 412, whose corresponding table 404 (not shown) includes in corresponding part 414 (not shown) core 11.

Thus, core 5 replicates the requested cache line to core 10. Core 10 then services the cache line request from core 11.

Figure 5:
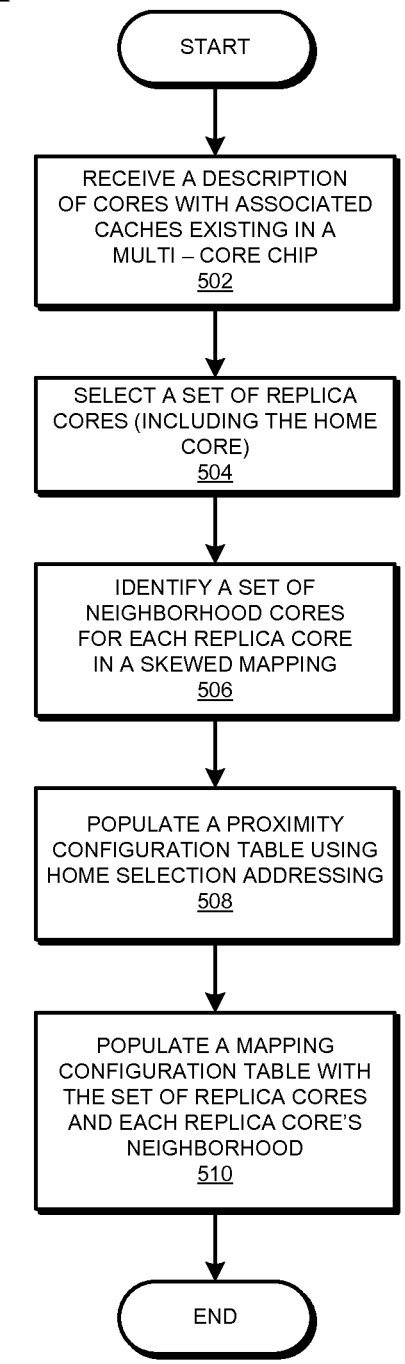
FIG. 5 depicts a flowchart of an example process of creating the skewed mapping and the mechanism to replicate using the skewed mapping in accordance with an illustrative embodiment.

With reference to FIG. 5, this figure depicts a flowchart of an example process of creating the skewed mapping and the mechanism to replicate using the skewed mapping in accordance with an illustrative embodiment. Process 500 can be implemented in a replication component associated with a multi-core chip, such as replication component 407 in FIG. 4.

Process 500 begins by receiving a description of the cores and associated caches existing in a multi-core chip (step 502). As an example, process 500 may receive grid 300 in FIG. 3 or grid 406 in FIG. 4 as the description of the cores in the corresponding multi-core chip. As an example, grid 406 in FIG. 4 provides process 500 with the identifiers of the various cores, e.g., cores 0-15 and their relative positions in grid 406 in FIG. 4.

Process 500 selects a set of replica cores, including the home core (which is also a replica core for a sub-grid) (step 504). As described earlier, the home or replica core functions may be assigned to certain cores according to the needs of particular implementation, including but not limited to cache line request volumes between certain nodes, latency tolerances between certain nodes, and other similar considerations.

Process 500 identifies a set of neighborhood cores for each replica core identified in step 504 (step 506). In other words, process 500 forms the skewed mapping according to an embodiment between certain cores and certain replica cores in step 506.

Process 500 populates a proximity configuration table, such as table 402 in FIG. 4, using home address selection addressing, such as home selection bits 410 in FIG. 4, (step 508). For each replica core identified in step 504, process 500 populates a mapping configuration table, such as table 404 in FIG. 4, with the replica cores and the neighborhood members of the replica core (step 510). Process 500 ends thereafter.

Figure 6:
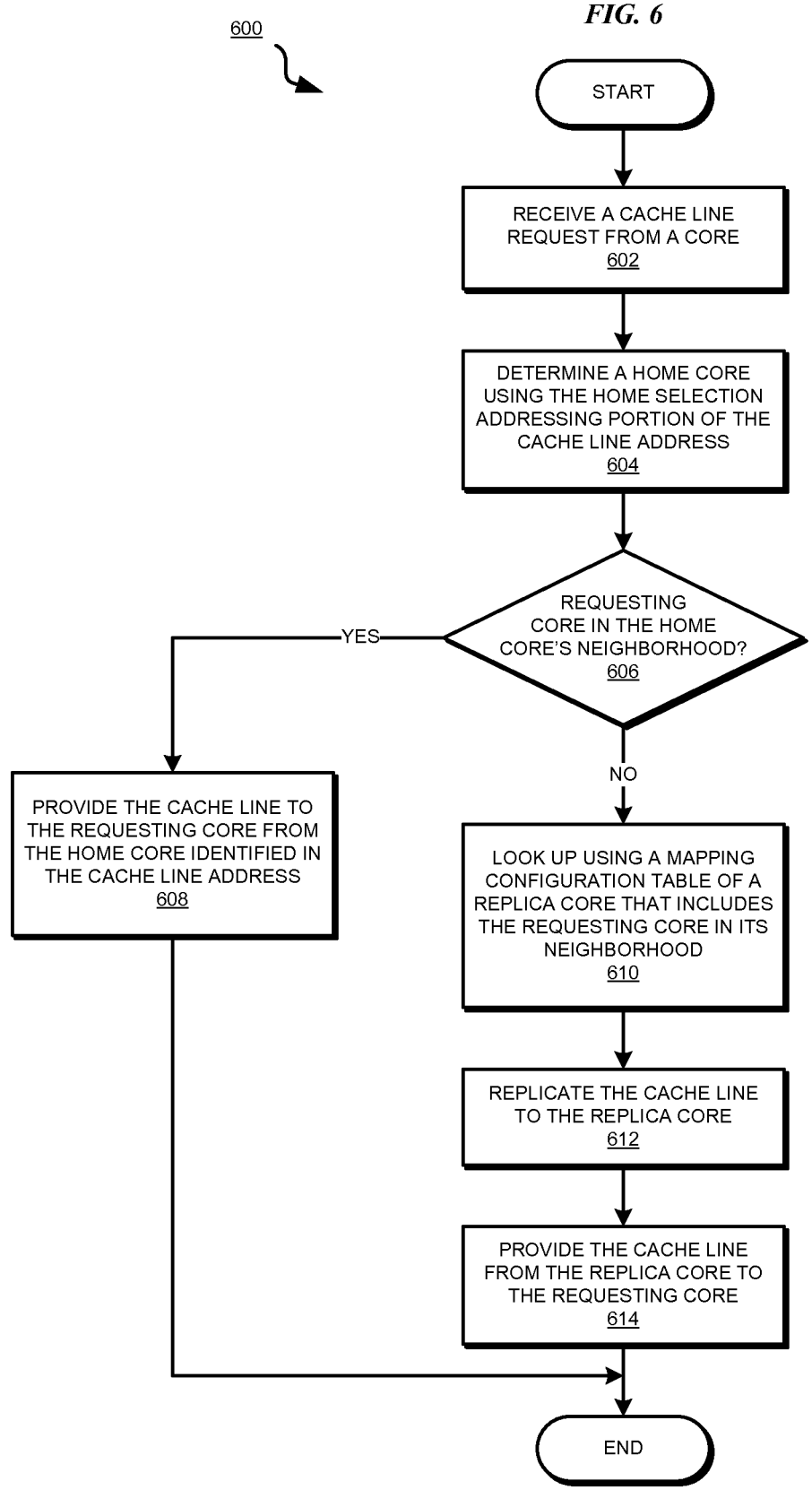
FIG. 6 depicts a flowchart of a process of flexible cache line replication using a skewed mapping in a multi-core chip in accordance with an illustrative embodiment.

With reference to FIG. 6, this figure depicts a flowchart of a process of flexible cache line replication using a skewed mapping in a multi-core chip in accordance with an illustrative embodiment. Process 600 can be implemented in a replication component, such as replication component 407 in FIG. 4.

Process 600 begins by receiving a cache line request from a core (step 602). Process 600 determines a home core, for example, by using the home selection addressing portion of the cache line address as described with respect to FIG. 4, (step 604). A home core is identified in step 604 only as an example. A replica core may be identified in step 604 in a similar manner within the scope of the illustrative embodiments.

Process 600 determines whether the requesting core of step 602 is within the neighborhood of the home core determined in step 604 (step 606). If the requesting core of step 602 is in the same neighborhood as the home core of step 604 ("Yes" path of step 606), process 600 provides the cache line to the requesting core from the home core identified in the cache line address (step 608). Process 600 ends thereafter.

If the requesting core of step 602 is not in the same neighborhood as the home core of step 604 ("No" path of step 606), process 600 looks up, using a mapping configuration table, such as table 404 in FIG. 4 that corresponds to the home core of step 604 and other replica cores in the multi-core chip, a replica core that includes the requesting core as a member of the neighborhood (step 610).

Process 600 replicates the requested cache line to the replica core identified in step 610 (step 612). Process 600 provides the requested cache line from the replica core to the requesting core (step 614). Process 600 ends thereafter.

Figure 7:
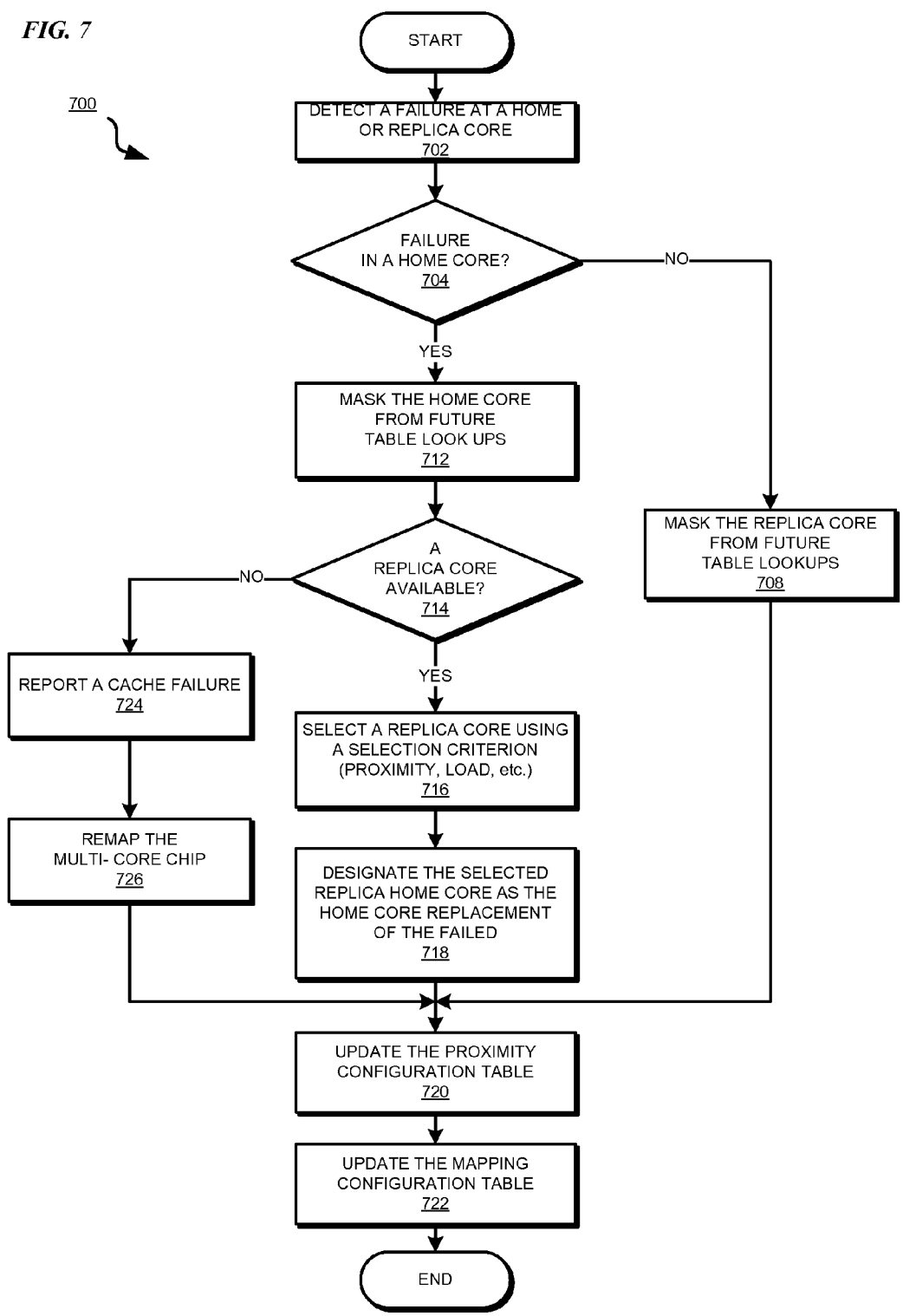
FIG. 7 depicts a flowchart of an example process of improved cache failure management using the skewed mapping in accordance with an illustrative embodiment.

With reference to FIG. 7, this figure depicts a flowchart of an example process of improved cache failure management using the skewed mapping in accordance with an illustrative embodiment. Process 700 can be implemented in a replication component, such as replication component 407 in FIG. 4.

Process 700 begins by detecting a failure at a home or replica core in a given multi-core chip (step 702). Process 700 determines whether the failure has occurred in a home core (step 704). If the failure is not in a home core ("No" path of step 704), process 700 determines that the core including the failure is a replica core and masks the failed replica core from future table lookups (step 708). Process 700 proceeds to step 720 thereafter. Masking a core prevents some or all use of the masked core until a future event. Masking can be accomplished in any manner suitable for a given implementation within the scope of the illustrative embodiments.

If the failure is in a home core ("Yes" path of step 704), process 700 masks the home core from future table lookups (step 712). Process 700 determines whether replica core is available to take over the responsibilities of the failed home core, such as to act as a home core for the multi-core chip and support the neighborhood of the failed home core as a replica core for the neighborhood (step 714).

If a replica core is available ("Yes" path of step 714), process 700 selects a replica core, such as in an order of priority according to portion 412 of table 404 in FIG. 4 associated with the failed home core, (step 716). The selection can be performed using proximity to the failed home core, load on the replica core, or another suitable criterion within the scope of the illustrative embodiments.

Process 700 designates the selected replica core as the replacement for the failed home core (step 718). Process 700 updates the proximity configuration table to reflect the replacement (step 720). Process 700 updates the mapping configuration table to reflect the replacement (step 722). Process 700 ends thereafter.

If a replica core is not available ("No" path of step 714), process 700 reports a cache failure (step 724). Process 700 remaps the cores in the multi-core chip according to a new skewed mapping, such as after a reboot, (step 726). Process 700 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a system, and computer program product are provided in the illustrative embodiments for a flexible replication with skewed mapping in a multi-core chip. Using an embodiment of the invention a skewed mapping can be created between the cores of a multi-core chip. The skewed mapping can then be used for improving the performance of cache replication.

While certain embodiments are described with respect to distances between cores as a cost function, such cost functions are only used as examples and not as a limitation on the invention. Other cost functions, such as a type of cores (when the cores are of different types on a given multi-core chip), loads on the various cores, preference to use certain cores for certain functions, latency tolerances of the various cores, and other criteria can also be used in conjunction with an embodiment in a similar manner within the scope of the invention.

As will be appreciated by one skilled in the art, aspects of the present invention may be embodied as a system, method, or computer program product. Accordingly, aspects of the present invention may rake the form of an entirely hardware embodiment, an entirely software embodiment (including firmware, resident software, micro-code, etc.) or an embodiment combining software and hardware aspects that may all generally be referred to herein as a "circuit," "device," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer readable storage device," "computer usable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer usable program product comprising a computer usable storage device including computer usable code for a flexible replication with skewed mapping in a multi-core chip, the computer usable code comprising:

computer usable code for receiving, at a receiver core in the multi-core chip from a requester core in the multi-core chip, a request for a cache line, wherein the receiver and requester cores comprise electronic circuits, and wherein the multi-core chip comprises a set of cores including the receiver and the requester cores;

computer usable code for identifying a target core from the request to which the request is targeted;

computer usable code for determining whether the target core includes the requester core in a neighborhood of the target core, the neighborhood including a first subset of cores mapped to the target core according to a skewed mapping;

computer usable code for replicating, responsive to the determining being negative, the cache line from the target core to a replication core; and computer usable code for providing the cache line from the replication core to the requester core.

2. The computer usable program product of claim 1, further comprising:

computer usable code for selecting, from the set of cores a second subset of cores, the second subset including the target core;

computer usable code for designating target core a home core; and computer usable code for designating the first subset the neighborhood of the home core, such that each member of the first subset receives cache lines from the home core.

3. The computer usable program product of claim 2, wherein the second subset includes the replication core, further comprising:

computer usable code for designating the replication core a replica core for the home core;

computer usable code for populating a first table associated with the home core with an identifier of the replica core;

computer usable code for populating the first table with identifiers of each member of the neighborhood of the home core;

computer usable code for selecting a third subset of cores from the set of cores;

computer usable code for designating the third subset a neighborhood of the replica core, the neighborhood of the replica core including the requester core;

computer usable code for populating a second table associated with the replica core with an identifier of the home core; and computer usable code for populating the second table with identifiers of each member of the neighborhood of the replica core, wherein the replicating is responsive to a lookup of the second table.

4. The computer usable program product of claim 1, wherein the computer usable code is stored in a computer readable storage device in a data processing system, and wherein the computer usable code is transferred over a network from a remote data processing system.

5. The computer usable program product of claim 1, wherein the computer usable code is stored in a computer readable storage device in a server data processing system, and wherein the computer usable code is downloaded over a network to a remote data processing system for use in a computer readable storage device associated with the remote data processing system.

6. A data processing system for a flexible replication with skewed mapping in a multi-core chip, the data processing system comprising:

a storage device, wherein the storage device stores computer usable program code; and a processor, wherein the processor executes the computer usable program code, and wherein the computer usable program code comprises:

computer usable code for receiving, at a receiver core in the multi-core chip from a requester core in the multi-core chip, a request for a cache line, wherein the receiver and requester cores comprise electronic circuits, and wherein the multi-core chip comprises a set of cores including the receiver and the requester cores;

computer usable code for identifying a target core from the request to which the request is targeted;

computer usable code for determining whether the target core includes the requester core in a neighborhood of the target core, the neighborhood including a first subset of cores mapped to the target core according to a skewed mapping;

computer usable code for replicating, responsive to the determining being negative, the cache line from the target core to a replication core; and computer usable code for providing the cache line from the replication core to the requester core.

\* \* \* \* \*